United States Patent [19]

Chapman

[11] Patent Number: 5,467,965
[45] Date of Patent: Nov. 21, 1995

[54] VALVE SYSTEM

[76] Inventor: John E. Chapman, 23 Sophia Street, Kingston Tas. 7050, Australia

[21] Appl. No.: 361,879

[22] Filed: Dec. 22, 1994

Related U.S. Application Data

[63] Continuation of Ser. No. 211,514, filed as PCT/AU92/00530, Oct. 2, 1992, abandoned.

[30] Foreign Application Priority Data

Oct. 2, 1991 [AU] Australia ..................... PK8679

[51] Int. Cl.⁶ ..................................... F16K 1/226
[52] U.S. Cl. ............................. 251/160; 251/162
[58] Field of Search ..................... 251/160, 162, 251/163

[56] References Cited

U.S. PATENT DOCUMENTS

| | | | |
|---|---|---|---|
| 2,892,609 | 6/1959 | Bibbo | 251/163 |
| 3,141,648 | 7/1964 | White | 251/163 |
| 3,780,983 | 12/1973 | Topbaur et al. | 251/163 X |
| 4,013,264 | 3/1977 | Friedell | 251/162 X |

FOREIGN PATENT DOCUMENTS

| | | |
|---|---|---|
| 50709/79 | 3/1980 | Australia . |
| 1184986 | 7/1959 | France . |
| 1076456 | 2/1960 | Germany . |
| 1926151 | 12/1969 | Germany . |
| 3535637 | 3/1987 | Germany . |
| 44-9422 | 1/1969 | Japan ..................... 251/163 |

*Primary Examiner*—John C. Fox
*Attorney, Agent, or Firm*—Merchant, Gould, Smith, Edell, Welter & Schmidt

[57] ABSTRACT

A butterfly valve comprises: an elongate valve body (1) having a flange (2) at one end, a valve plate (4), operative between an open and closed position, forming a seal with the said flange (2) in the closed position, and a valve plate support structure including: a location cam (14) seated within an abutment plate housing (10), and operable to effect movement of the valve plate (4); a shaft (5), operable to effect movement of the cam by rotational movement of the shaft; and an abutment plate (12), formed within the abutment plate housing (10); wherein rotational movement of the shaft (5) will result in independent rotational movement and linear movement of the said location cam (14) within the abutment plate housing (10) and operable to effect independent rotational movement and linear movement of the valve plate.

20 Claims, 2 Drawing Sheets

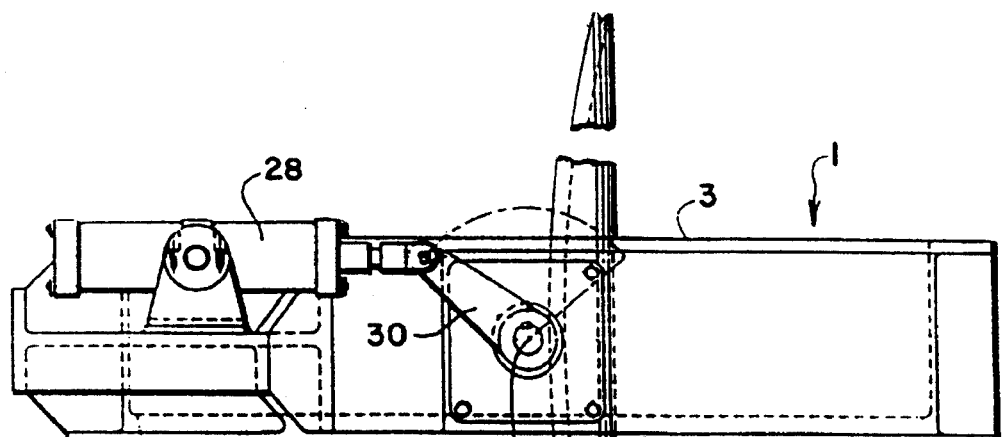
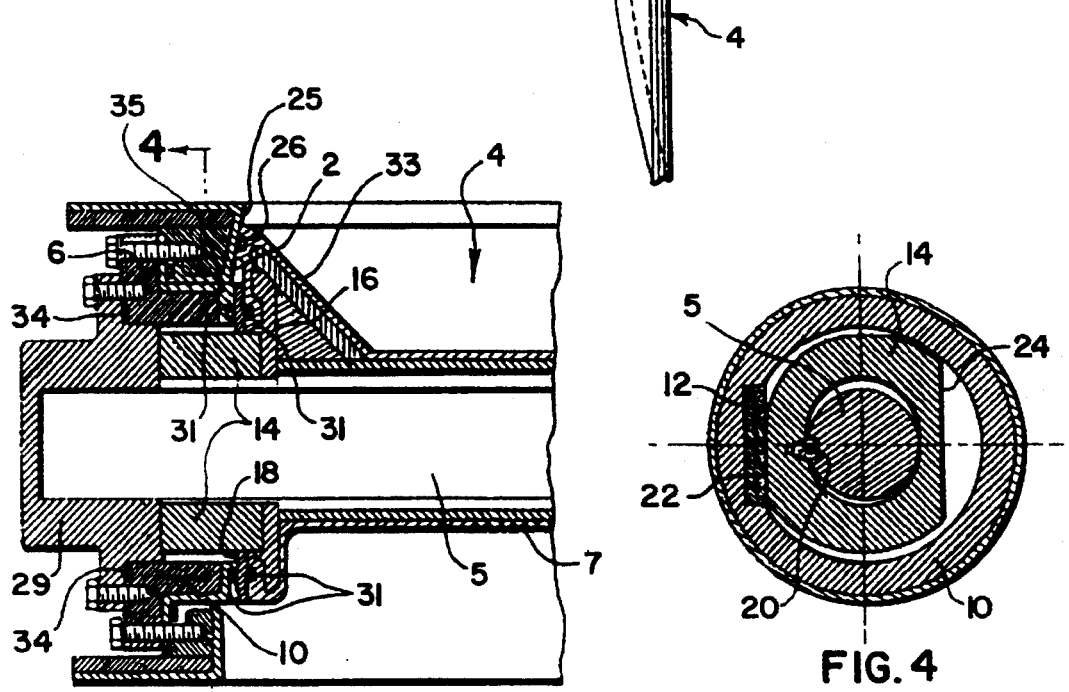
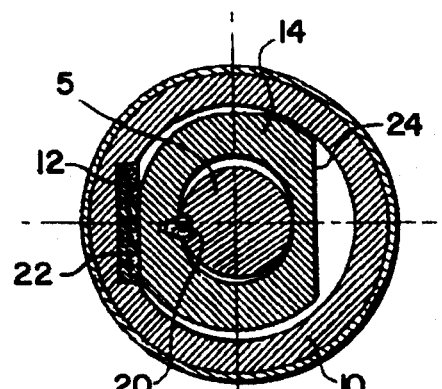
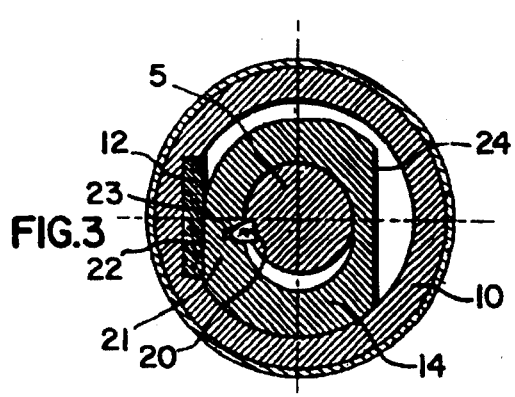
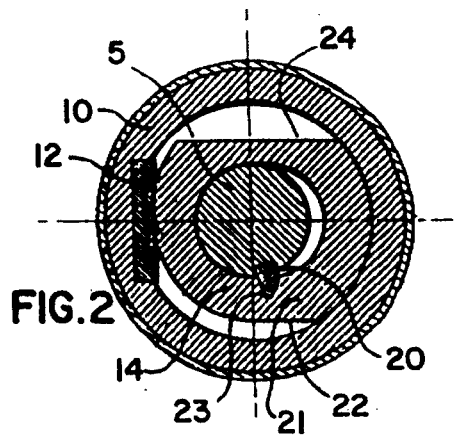

1

VALVE SYSTEM

This is a continuation of prior application Ser. No. 08/211,514, filed as PCT/AU92/00530, Oct. 2, 1992, entitled VALVE SYSTEM now abandoned.

The present invention resides in a valve system, and in particular to a valve system that is applicable for use in a gas stream.

It is essential that valves, particularly those valves that are used in a gas stream, provide an efficient seal to prevent gas leakage. Typical valves that are used in such systems include a leaf valve or a plate valve. Such valves usually involve a simple one step action to move the valve from a closed to an open position. In the case of a plate valve, such movement is usually a rotational movement wherein the plate is associated with a shaft, and rotation of the shaft causes the rotation of the plate.

In order to ensure an adequate seal, O-rings or other such seals are either positioned around the plate or valve disk itself, to ensure an adequate seal. In time, such seals may wear, or alternatively simply fail to seal the valve adequately due to the imprecise nature of the valve.

Alternatively, a flange or valve seat may be associated with a pipe or channel through which the gas, or other such fluid will flow. The valve seat will assist in the sealing of the valve by abutting against the plate when in a closed position. Again, the effectiveness of such sealing may be inhibited given the imprecise positioning of the valve relative to the valve seat, and fail to provide a positive seal for the gas stream.

Other valve systems are able to impart both rotational and linear movement to a valve plate, such as in FR 1,184,986. However, the valve system disclosed in this specification relies on a ball dentate system to rotate a cam within the mounting. As such, a high degree of tolerance is required within the spring, and the valve system is unable to cope with various stresses such as heat.

Accordingly, it is an object of the present invention to overcome or at least alleviate one or more of the difficulties associated with the prior art.

The present invention resides in a valve system comprising;
 an elongate valve body having a valve seat at one end,
 a valve plate, operable between an open and closed position, forming a seal with the said valve seat in the closed position, and
 a valve plate support structure including;
  a transmission member seated within an abutment plate housing, the transmission member having a shaped portion to interact with an abutment plate formed within the abutment plate housing, and operable to effect movement of the valve plate; and
  a shaft, associated with and to remain connected to the transmission member during operation, and operable to effect movement of the transmission member by rotational movement of the shaft;
 wherein rotational movement of the said shaft will result in independent rotational movement and linear movement of the said transmission member within the abutment plate housing, the said rotational movement being imparted directly by the rotational movement of the shaft, the said linear movement being imparted by the relative forces between the shaped portion of the transmission member and the Abutment plate upon further rotation of the shaft, and operable to effect independent rotational movement and linear movement of the valve plate.

The mechanism of the present invention allows for an efficient valve seal mechanism, sufficiently effective to provide a positive seal against gas flowing through a gas stream.

Preferably, the transmission member is constructed of a hardened material such as steel or the like. The form of the transmission member provides the valve plate support structure with the capability to undergo rotational and linear movement through operation of the valve system.

Preferably, the transmission member is seated in the abutment plate housing that houses an aubutment plate. The abutment plate is preferably constructed of a hardened steel, and has a flat surface that is able to interact with the rotation of the transmission member. The abutment plate itself may be included as an addition to the housing so that it can be removed and replaced if worn, or formed integrally with the housing. In a most preferred form, the abutment plate provides a smooth surface to interact with the transmission member. The transmission member should be seated such that it is capable of rotational and linear movement within the abutment plate housing. The linear movement of the transmission member may also be a function of the positioning of the shaft through the transmission member.

The rotation of the transmission member is limited by the form of the transmission member and the influence of the abutment plate. The transmission member is substantially ring shaped having at least a shaped portion, preferably a flatened surface on the outer circumference of the ring, that limits the rotational capability of the transmission member. The form of the transmission member should allow it to rotate in a planer orientation, through the influence of rotation of the shaft, until such time that the shaped portion meets the abutment plate wherein further rotation of the shaft results in a linear movement of the transmission member. The linear movement is in fact imparted by the relative forces that are created between the abutment plate and the shaped portion of the transmission member. As further rotation of the transmission member is prevented by this interaction, linear movement occurs as the transmission member is forced to slide along the surface of the abutment plate.

The transmission member should also be seated within a transmission member housing associated with the valve plate. The transmission member housing should be so formed so that the transmission member can be secured into the housing, such that rotation or linear movement of the transmission member results in the same movement of the transmission member housing. The transmission member housing may be formed integrally with the valve plate such that resultant movement of the transmission member housing results in the same movement of the valve plate. In one preferred form, the transmission member housing and the abutment plate housing substantially enclose the transmission member.

In one form, the transmission member itself may be formed integrally with the transmission member housing. It is preferred however, that the transmission member is formed separately of the transmission member housing, as it allows for replacement of this transmission member, should it become worn.

The valve plate itself is housed within a valve body, having at least a valve seat at one end of the valve body. The abutment member housing is secured to the valve body. The closing of the valve may be initiated through a rotation of the .valve plate to prevent the flow of the gas, or such like fluid, through the valve. A positive seal for the valve may be achieved by the linear movement of the valve plate toward the flange to seal against the valve seat.

The valve system may also include a washer, preferably made of teflon, primarily to assist in the movement of the valve plate. The teflon washer is placed to surround the transmission member and to move with the transmission member. The washer is then able to provide a smooth surface for the relative movement between the valve plate and the mechanism that has secured the abutment plate housing to the valve body. O-rings associated with this securing mechanism, or the abutment plate housing will slide over the surface of the washer and provide an adequate seal for the valve system.

The valve seat itself may be angled so that the valve plate is actually forced into a slightly truncated cone. O-rings or other resilient sealing means surrounding either the valve seat or the plate assist in sealing the valve. Preferably, the O-ring is housed within an anular groove surrounding the outer circumference of the plate. The linear movement of the plate forces the plate into the angled valve seat providing a positive seal of the valve seat with the seal. This also allows the valve plate to be "self centering" within the valve seat as a result of the flexibility provided by the O-rings. The valve plate may be bevelled or shaped toward the outer circumference of the valve plate, to assist in forming the positive seal within the valve seat.

The shaft is associated with the transmission member and is passed through the transmission member. The shaft preferably has a concentric axis with the abutment plate housing and an eccentric axis with the transmission member. The shaft is however connected to the transmission member, preferably by a gear or such like, into a slot in the inner circumference of the transmission member. The transmission member will then rotate with the shaft, until such time that the shaped or flatened portion of the transmission member interacts with the abutment plate and prevent further rotation of the transmission member. As a consequence of the eccentric axis of the shaft and the transmission member, the form of the shaped portion of the transmission member and of prevailing forces, further rotation of the shaft will result in a linear movement of the transmission member.

The nature of the transmission member interacting with the abutment plate, allows for a degree of lateral "slop" along the shaft. That is, high tolerances between the shaft and the transmission member are not required, as it is the interaction between the abutment plate and the transmission member that causes the lateral movement of the valve plate.

Rotation of the shaft may be actuated by any standard means. Preferably, such rotation is mechanically actuated, for example by a hydraulic or pneumatic piston device or such like. Alternatively, the shaft may be manually driven.

The shaft preferably interconnects two such valve plate support structures. Preferably the valve plate contains a rib along its back surface through which the shaft may pass. The rib provides strength for the valve plate and in conjunction with the shaft, also provides a pivotal axis upon which the valve plate can rotate.

It should be appreciated however that the drawings are intended to be illustrative of a preferred embodiment of the invention and the generality of the invention should not be considered to be limited thereto.

FIGS. 2, 3 and 4 illustrate schematically the movement of the transmission member upon rotation of the shaft.

FIG. 5 illustrates a cross-sectional view of the valve system in a closed position.

FIG. 6 illustrates an actuating mechanism for the valve system.

Figure 1:
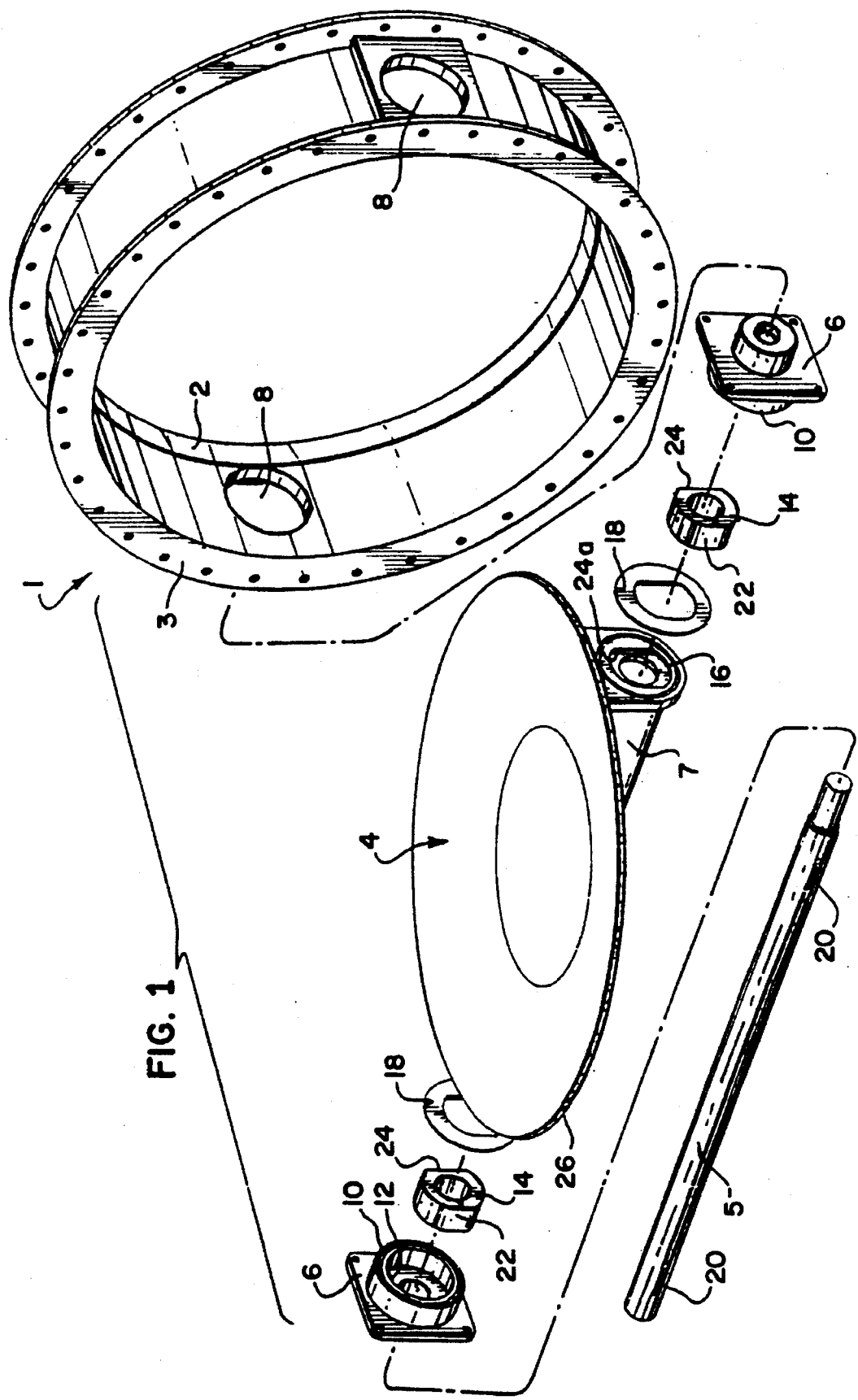
FIG. 1 illustrates an exploded view of the valve system according to the invention.

As illustrated in the drawings, and in particular in FIG. 1, the valve system has a substantially cylindrical valve body 1 having a valve seat 2 and 3 associated at either end. A valve plate 4 is operable within the valve body to move from an open position, which will allow gas or such fluid to pass through the valve, to a closed position.

The valve plate has a valve plate support structure to determine the movement of the plate. The support structure consists of a shaft 5 which passes through two support brackets 6, the brackets being located and fixed around apertures 8 through the valve body 1. The support bracket 6 also supports an abutment plate housing 10 that contains an abutment plate 12 and secures this to the valve body. The abutment plate housing is so formed to seat the transmission member 14. The transmission member is also formed to seat within transmission member housing 16. The shape of the transmission member 14 is so formed to key into the transmission member housing 16. Flatened surface 24 assists in securing the transmission member within the transmission member housing as it is secured by corresponding surface 24a. A washer 18 is included to assist in the smooth movement of the valve plate. The shaft itself passes through the transmission member and transmission member housing and through a rib 7 at the back of valve plate 4. The rib 7 provides strength and support for the valve plate, and also a pivotal axis for the valve plate.

Shaft 5 includes a tooth 20 which is located within a slot 23 within the interior surface of the transmission member 14. This is better illustrated in FIGS. 2 to 4. These figures better illustrate the movement of the transmission member upon rotation of the shaft.

FIG. 2 illustrates the valve in an open position with the transmission member 14 located within the abutment plate housing 10. The shaft 5 has a concentric axis to the abutment plate housing 10, but an eccentric axis to the transmission member 14. The transmission member has a shaped section 21 resulting in flatened surface 22 on its outer perimeter. The shaft is able to rotate the transmission member through the connection of gear 20 within slot 23. It can be seen that the shaft maintains a degree of lateral play or slop within the transmission member, and does not rely upon high tolerance.

FIG. 3 illustrates rotation of the shaft through approximately 90°, and consequential rotation of the transmission member through the same angle. Although not illustrated in this particular drawing, this will result in a 90° rotation of the valve plate, moving the valve plate from an open to a closed position. The movement of the valve plate is initiated through rotating of the transmission member housing 16, best illustrated in FIG. 1. At this point, abutment plate 12 has met with the shaped portion 21, and in particular flatened surface 22 preventing the transmission member from further rotation.

FIG. 4 illustrates further rotation of the shaft through approximately 5°, and as a consequence of the eccentric axis with the transmission member, and of the shaped portion 21, the transmission member undergoes linear movement. Again, in operation, such linear movement of the transmission member, as it is secured into transmission member housing 16, results in the same movement being applied to the transmission member housing and the valve plate. This will result in a linear movement forward of the valve plate to a sealed, closed position as it is pressed into valve seat 2.

FIG. 5 illustrates a cross-sectional view of the valve in a closed position as illustrated in FIG. 4 and is located in an anular groove. O-ring 26 is surrounding the outer perimeter of plate 4. Valve seat 2 has an angled surface 25, and rotation of shaft 5 results in the linear movement of transmission member 14, which is secured into housing 16, toward valve seat 2. The angle of the valve seat surface consequently wedges the outer surface of valve plate 4, and O-ring 26 into the valve seat. The valve plate 4 has a bevelled edge 33, to assist in forming an adquate seal. Such linear movement of the plate provides a positive seal for the valve system.

An end cap 29 is located at the end of shaft 5 and is positioned to hold the abutment plate housing, transmission member and transmission member housing in place. O-rings 31 and 34 assist in providing a seal around the valve plate support system.

The valve plate is also formed against washer 18. The O-rings 31 are able to slide against the smooth surface of the washer, to assist in smooth movement of the valve plate relative to the securing means 35, and to provide a more effective seal within the inner working of the valve system. Washer 18 and O-ring 31 also allow lateral movement of the transmission member housing 16 and thereby valve plate 4 to allow self-centering of the valve plate edge 33 into valve seat 2.

FIG. 6 illustrates a pneumatic actuating device 28 with arm 30 connected to shaft 5. Actuation of this device results in a rotation of the shaft 5 and consequently opening or closing of the valve system.

The present valve system provides improved sealing for a gas stream or the like given, the dual movement of
the valve plate. Such dual movement of the plate is achieved through a single movement of the actuating means. There is therefore provided an valve system providing a positive seal for such purposes.

It should be understood that various other modifications, and or alterations may be made without departing from the spirit: of the invention as outlined herein.

I claim:

1. A valve system comprising;

an elongate valve body having a valve seat at one end, a valve plate, operable between an open and closed position, forming a seal with the said valve seat in the closed position, and a valve plate support structure including;

a transmission member seated within an abutment plate housing, the transmission member having a shaped portion to interact with an abutment plate formed within the abutment plate housing, and operable to effect movement of the valve plate; and a shaft, associated with and to remain connected to the transmission member during operation, and operable to effect movement of the transmission member by rotational movement of the shaft;

wherein rotational movement of the said shaft will result in independent rotational movement and linear movement of the said transmission member within the abutment plate housing, the said rotational movement being imparted directly by the rotational movement of the shaft, the said linear movement being imparted by the relative forces between the shaped portion of the transmission member and the abutment plate upon further rotation of the shaft, and operable to effect independent rotational movement and linear movement of the valve plate.

2. A valve system according to claim 1, wherein said transmission member is substantially ring shaped having a substantially round circumference with a shaped portion to interact with the said abutment plate, said shaft having an eccentric axis with said transmission member and a concentric axis with said abutment plate housing, wherein said transmission member is seated within the abutment plate housing, in such a manner that the transmission member undergoes rotation within the abutment plate housing until such time that said shaped portion coincides with said abutment plate, wherein further rotational movement of the shaft results in linear movement of the transmission member due to the relative forces between the transmission member and the abutment plate.

3. A valve system according to claim 2, wherein the transmission member is also seated within a transmission member housing and secured into the member housing such that the movememt of the transmission member will result in comparable movement of the transmission member housing, the transmission member housing being associated with the valve plate, such that movement of the transmission member housing, causes resultant movement of the valve plate.

4. A valve system according to claim 1 wherein the transmission member is also seated within a transmission member housing and secured into the member housing such that movement of the transmission member will result in comparable movement of the transmission member housing, the transmission member housing being associated with the valve plate, such that movement of the transmission member housing causes resultant movement of the valve plate.

5. A valve system, according to claim 4 wherein the shaft is connected to the transmission member by a gear, interacting with a slot in the inner circumference of the transmission member.

6. A valve system, according to claim 1 wherein the shaft is connected to the transmission member by a gear, interacting with a slot in the inner circumference of the transmission member.

7. A valve system according to claim 6, wherein rotational movement of the transmission member results in rotational movement of the valve plate, and linear movement of the transmission member results in a linear movement of the valve plate toward said valve seat.

8. A valve system according to claim 1, wherein rotational movement of the transmission member results in rotational movement of the valve plate, and linear movement of the transmission member results in a linear movement of the valve plate toward said valve seat.

9. A valve system, according to claim 8 wherein the valve seat includes an angled surface facing the valve plate, such that linear movement of the valve plate toward the valve seat will results in the valve plate being forced into the angled surface of the valve seat, to create a positive seal.

10. A valve system, according to claim 1 wherein the valve seat includes an angled surface facing the valve plate, such that linear movement of the valve plate toward the valve seat will result in the valve plate being forced into the angled surface of the valve seat, to create a positive seal.

11. A valve system according to claim 1 wherein the valve plate has an associated O-ring or resilient seal surrounding its circumference to form a seal with said valve seat.

12. A valve system according to claim 1, further including a washer surrounding the transmission member, and located to provide a smooth surface for the valve plate to move relative to the valve body.

13. A valve system according to claim 8, wherein the washer is made of teflon.

14. A valve system according to claim 13, including a plate support system on opposite sides of the valve plate, said shaft extending to connect and operate said plate support systems, and to provide a pivotal axis for said valve plate.

15. A valve system according to claim 14, wherein said abutment plate is made of hardened steel and is removably affixed to the abutment plate housing.

16. A valve system according to claim 15, wherein the shaft extends beyond the valve body to allow for actuation of the shaft.

17. A valve system, according to claim 16 wherein the rotation of the shaft is actuated by mechanical means.

18. A valve system according to claim 1, wherein the valve body includes a valve seat at either end.

19. A valve system according to claim 1, wherein the member housing is formed integrally with the valve plate.

20. A valve system, according to claim 1 wherein the shaft maintains a degree of lateral play within the transmission member.

* * * * *